(12) United States Patent
Van Den Dungen (10) Patent No.: US 9,438,306 B2
(45) Date of Patent: Sep. 6, 2016

(54) METHOD OF DETERMINING THE POSITION OF A DEVICE AND A DEVICE THAT IMPLEMENTS THE METHOD

(71) Applicant: KONINKLIJKE PHILIPS N.V., Eindhoven (NL)

(72) Inventor: Wilhelmus Andreas Marinus Arnoldus Maria Van Den Dungen, Boxtel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/401,329

(22) PCT Filed: Jun. 7, 2013

(86) PCT No.: PCT/IB2013/054689
§ 371 (c)(1),
(2) Date: Nov. 14, 2014

(87) PCT Pub. No.: WO2013/183033
PCT Pub. Date: Dec. 12, 2013

(65) Prior Publication Data
US 2015/0098494 A1    Apr. 9, 2015

Related U.S. Application Data

(60) Provisional application No. 61/657,056, filed on Jun. 8, 2012.

(51) Int. Cl.
*H04B 1/707* (2011.01)
*G01S 19/30* (2010.01)
(Continued)

(52) U.S. Cl.
CPC ............ *H04B 1/707* (2013.01); *G01S 19/30* (2013.01); *G01S 19/34* (2013.01); *G01S 19/37* (2013.01); *G01S 19/09* (2013.01); *G01S 19/17* (2013.01)

(58) Field of Classification Search
CPC ..................................................... H04B 1/707
See application file for complete search history.

(56) References Cited

U.S. PATENT DOCUMENTS 6,336,076 B1 * 1/2002 Farley et al. ................ 701/469
6,590,525 B2   7/2003 Yule et al.
(Continued)

FOREIGN PATENT DOCUMENTS

GB   2285135 A    6/1995
JP   H091632763 A   6/1997
(Continued)

OTHER PUBLICATIONS

Dooley et al: "Software GPS: A Revolutionary Approach Enabling Indoor Operation at Low Cost": Corporate Research Exhibition 2003, 2 Page Document.
(Continued)

*Primary Examiner* — Erin File (57) ABSTRACT

There is provided a method of determining the position of a device using a satellite positioning system, the method comprising (a) operating a satellite positioning system receiver in the device to collect a plurality of sets of signals; and, when the position of the device is to be determined (b) processing a set of signals to determine if the set is likely to contain signals from satellites in the satellite positioning system; and (c) if it is determined in step (b) that the set of signals is likely to contain signals from satellites in the satellite positioning system, processing the set of signals to calculate the position of the device; (d) if it determined in step (b) that the set of signals is not likely to contain signals from satellites in the satellite positioning system, repeating steps (b), (c) and (d) with another set of signals.

21 Claims, 5 Drawing Sheets

(51) Int. Cl.
*G01S 19/34* (2010.01)
*G01S 19/37* (2010.01)
*G01S 19/09* (2010.01)
*G01S 19/17* (2010.01)

(56) References Cited

U.S. PATENT DOCUMENTS

| | | | |
|---|---|---|---|
| 6,728,637 B2 * | 4/2004 | Ford et al. .................. | 701/477 |
| 7,679,556 B2 | 3/2010 | Marshall et al. | |
| 2001/0026240 A1 | 10/2001 | Neher | |
| 2002/0044085 A1 | 4/2002 | Howell et al. | |
| 2005/0270233 A1 | 12/2005 | Dooley et al. | |
| 2008/0231510 A1 | 9/2008 | Marshall et al. | |
| 2009/0179794 A1 | 7/2009 | Dooley et al. | |
| 2010/0328151 A1 * | 12/2010 | Shirai .................... | 342/357.61 |
| 2012/0154210 A1 * | 6/2012 | Landau et al. ............ | 342/357.23 |
| 2012/0286991 A1 * | 11/2012 | Chen et al. ............... | 342/357.23 |
| 2013/0201055 A1 * | 8/2013 | Hadef .................... | 342/357.25 |

FOREIGN PATENT DOCUMENTS

| | | |
|---|---|---|
| WO | 0163316 A1 | 8/2001 |
| WO | 0189105 A1 | 11/2001 |
| WO | 0192911 A1 | 12/2001 |
| WO | 0196898 A2 | 12/2001 |
| WO | 0201813 A2 | 1/2002 |
| WO | 0225309 A1 | 3/2002 |
| WO | 0237710 A1 | 5/2002 |
| WO | 02059637 A1 | 8/2002 |
| WO | 02063330 A1 | 8/2002 |
| WO | 02082850 A1 | 10/2002 |
| WO | 03023442 A2 | 3/2003 |
| WO | 2004040328 A1 | 5/2004 |
| WO | 2004090903 A1 | 10/2004 |
| WO | 2005045458 A1 | 5/2005 |
| WO | 2007034419 A1 | 3/2007 |
| WO | 2010072540 A1 | 7/2010 |

OTHER PUBLICATIONS

Fastrax: "Smart Positioning With Fastrax Software GPS Receiver"; White Paper, pp. 1-6, 2008.
Fastrax iT1900 GPS RF Front End Module Brochure, 2 Page Document, Oct. 2, 2008.
Fastrax Software GPS, Brochure, 2 Page Document, 2011.
Fastrax REV 1.0 Technical Datasheet, 25 Page Document, Dec. 2010.
Spencer: "Adding GPS to a GSM Mobile Handset"; Philips Research, Redhill, Technical Note PR-TN-2004/00690, 41 Page Document, Sep. 2004.
Whight: "A Practical GPS Electronic Accelerometer and the Determination of User Acceleration"; Technical Note 3766, Philips Research, Redhill, Sep. 1998. 28 Pages.
Dooley et al: "Indoor GPS Algorithms & Experiments, Part 11-Efficient ARM Implementation"; Technical Note PR-TN-2003/00382, Philips Research, Jun. 2003, 107 Page Document.
Chu et al: "Positioning in Conventional Mobile Cellular Systems and P2P Enabled TD-SCDMA Systems"; Technical Note PR-TN 2005/00994, Philips Research, Nov. 2005, 47 Page Document.
Marshall et al: "Instantaneous, Low-Power Geotagging"; UBLOX, White Paper, Jul. 2009, 10 Page Document.
Madni et al: "Energy Efficient Localization Framework for Mobile Applications"; Sensorcomm, 2011, The Fifth International Conference on Sensor Technologies and Applications, 2011, pp. 151-156.

* cited by examiner

METHOD OF DETERMINING THE POSITION OF A DEVICE AND A DEVICE THAT IMPLEMENTS THE METHOD

CROSS-REFERENCE TO PRIOR APPLICATIONS

This application is the U.S. National Phase application under 35 U.S.C. §371 of International Application Serial No. PCT/IB2013/054689, filed on Jun. 7, 2013, which claims the benefit of U.S. Application Ser. No. 61/657,056, filed on Jun. 8, 2012. These applications are hereby incorporated by reference herein.

TECHNICAL FIELD OF THE INVENTION

The invention relates to portable or mobile devices that include a receiver, such as a satellite positioning system receiver, the measurements from which are used to provide a measurement of the position of the device.

BACKGROUND TO THE INVENTION

Many elderly people now carry personal help buttons (PHBs) or personal emergency response systems (PERS) that they can activate if they need urgent assistance, such as when they fall. Automated fall detectors are also available that monitor the movements of the user and automatically trigger an alarm if a fall is detected.

These devices (i.e. PHBs, PERS and fall detectors) can initiate a landline call via a base unit located nearby to the user (i.e. typically in the user's home) to a dedicated call center when they are activated, and the personnel in the call center can talk to the user and arrange for assistance to be sent to the user in an emergency. As the user is a registered subscriber to the PHB/PERS service, their home location (or other location where the base station is found) will be known, and the emergency assistance can be directed to that location by the call center personnel.

However, systems are now available that make use of a mobile telephone or other mobile telecommunications-enabled device carried by the user to allow the PHB, PERS or fall detector device to initiate a call over a mobile telecommunications network to the call center. These devices are sometimes referred to as mobile PERS (MPERS) devices and can be used anywhere where there is cellular network coverage. As the typical users of these MPERS devices are elderly or those with some form of physical or mental impairment, it is important for the devices to be as simple to operate as possible. As a result, mobile telecommunications functionality is preferably integrated into a dedicated PHB or PERS pendant that is worn by the user and that typically only has a single activation button or a very small number of manual controls. On activation of the MPERS device, a call is automatically placed to the call center number preset in the device.

It is also desirable for these MPERS devices to be able to determine the location of the device (and thus the user) when an event such as a fall or the user pressing the PHB to request assistance occurs and to pass this location to the call center or emergency services so that the user can be easily located.

Currently, satellite positioning systems, such as GPS, are one of the most accurate location data sources available to portable or mobile electronic devices, such as an MPERS device. However, there are a number of drawbacks associated with satellite positioning systems. For example, it might not be possible to receive signals from the satellites when the device is indoors, under heavy foliage or in an 'urban canyon' (i.e. between a number of tall buildings), making it impossible to obtain a location measurement (sometimes referred to as a 'fix'). Satellite positioning systems can also be prone to errors in the location measurement which can be due to a number of different reasons, including 'multipathing' where the signals from a satellite can reflect off of buildings before reaching the satellite positioning system receiver. These errors can cause the reported location to be some distance from the actual location, sometimes even as far as several city blocks. Another drawback with satellite positioning systems is that the receiver consumes a relatively large amount of power while making a location measurement.

Although the satellite positioning system receiver can be manually activated and deactivated by a user of the device to help reduce the power consumption, when some event occurs where it is useful to know the exact location of the MPERS device (for example if the user of the device is placing an emergency call and needs to provide their exact location, or the user of the device suffers a fall or other accident and the device is configured to automatically request assistance for the user), activating the satellite positioning system receiver and attempting a measurement is not without risk, as it might not be possible to get a measurement in the current location of the device.

Therefore, in such situations, it can be useful to make use of the last known location of the device obtained using the satellite positioning system receiver before the satellite signal was lost (this is sometimes referred to as 'backtracking' or 'breadcrumbing'). To do this, the satellite positioning system receiver must either collect location measurements continuously (which means that the receiver will quickly drain the battery of the device), or a 'breadcrumbing' technique is used, in which the satellite positioning system receiver is selectively activated by the device to intermittently receive satellite positioning system signals and make location measurements. As the receiver is not continuously powered or active, there is some reduction in the power consumption of the device. If the receiver is unable to determine the location of the device when it is activated, the last acquired location measurement (breadcrumb) is used as an estimate of the current location of the device.

A further concern is that the device may be in a location in which coverage from the mobile telecommunications network is poor and which only permits data transfer at very low data rates, which prevents a large amount of location data being transmitted from the MPERS device to the call center or emergency services quickly. Therefore, the need to transmit large amounts of location data from the MPERS device should be minimized.

Therefore, there is a need to improve the existing breadcrumbing techniques to maximize the battery life and reduce the frequency with which the user has to recharge or replace the batteries, while maximizing the chance that the device can provide an accurate location or position measurement when required.

SUMMARY OF THE INVENTION

According to a first aspect of the invention, there is provided a method of determining the position of a device using a satellite positioning system, the method comprising (a) operating a satellite positioning system receiver in the device to collect a plurality of sets of signals; and, when the position of the device is to be determined (b) processing a set of signals to determine if the set is likely to contain signals from satellites in the satellite positioning system; and (c) if it is determined in step (b) that the set of signals is likely to contain signals from satellites in the satellite positioning system, processing the set of signals to calculate the position of the device; (d) if it determined in step (b) that the set of signals is not likely to contain signals from satellites in the satellite positioning system, repeating steps (b), (c) and (d) with another set of signals. As processing a set of signals to determine if the set is likely to contain signals from satellites according to the invention requires much less processing and power than full processing of the signals to determine the position of the device, it is possible for the device to collect and assess the usefulness of a set of sampled signals as required while maximizing the battery life of the device.

Preferably, the another set of signals is a set of signals collected prior to the set of signals processed in step (b). This results in the method 'backtracking' through the collected sets of sampled signals until a set is found that can be used to determine the position of the device.

Preferably, step (b) comprises searching the set of signals for codes used by one or more satellites in the satellite positioning system. Each code is typically unique to a particular satellite in the satellite positioning system. In the case where the method is applied to GPS, the code is a PRN code.

Preferably, step (b) comprises determining the codes associated with one or more satellites in the satellite positioning system expected to be in view of the device at the time the set of signals was collected. This means that processing power and time is not wasted looking for codes associated with satellites that are not likely to be in view of the device.

The step of determining the codes can comprise obtaining the codes from a lookup table, which reduces the processing required by the device to determine the codes.

In a preferred embodiment, step (b) further comprises (i) multiplying the determined codes for the one or more satellites in the satellite positioning system together to form a combined code; (ii) multiplying a subset of the set of signals in a window by the combined code; and (iii) analyzing the output of step (ii) to determine if there is any match between the combined code and the set of signals in the window. Combining the codes to form a combined code means that the number of separate multiplication operations can be minimized.

In an alternative embodiment, step (b) comprises (i) multiplying a subset of the set of signals in a window by one of the determined codes; (ii) repeating step (i) for each of the determined codes; (iii) multiplying the output of each iteration of step (i) together; and (iv) analyzing the output of step (iii) to determine if there is any match between any of the determined codes and the set of signals in the window.

In either embodiment, the window can span a subset of signals whose duration is equal to an integer N multiple of the duration of a code, with N=1, 2, 3, . . . N is advantageously greater than 1 since this improves the sensitivity of the method as a larger portion of the set of sampled signals is searched for the code.

Preferably, the step of analyzing comprises filtering the output with a low pass filter; determining the amplitude, power or root mean squared, RMS, of the low pass filtered output; comparing the determined amplitude, power or RMS to a threshold value; and determining that there is a match between one of the determined codes and the set of signals in the window if the determined amplitude, power or RMS exceeds the threshold value.

In some embodiments, the threshold value is a fixed value. However, in preferred embodiments, the threshold value is adjusted based on a level of noise in the set of signals.

Preferably, if it is determined in the step of analyzing that there is no match between the determined codes and the set of signals in the window, step (b) further comprises shifting the window along the set of signals by a first amount and repeating the steps of multiplying for the subset of signals in the shifted window. Preferably, the first amount corresponds to the time taken by a satellite to transmit up to one bit of a code.

If it is determined in the step of analyzing that there is a match between the determined codes and the set of signals in the window, and step (b) requires two or more matches to be found, then step (b) further comprises shifting the window along the set of signals by a second amount and repeating the steps of multiplying for the subset of signals in the shifted window. Preferably, the second amount corresponds or substantially corresponds to the time taken by a satellite to transmit a code.

In some embodiments, step (c) comprises transmitting the set of signals that are likely to contain signals from satellites in the satellite positioning system to a remote terminal, and wherein the processing of the set of signals to calculate the position of the device is performed by the remote terminal. Alternatively, the processing in step (c) can be performed by the device.

Preferably, step (a) comprises activating the satellite positioning system receiver in the device for a predetermined time period and sampling the received signals to generate a set of signals. Preferably, activating the satellite positioning system receiver in the device comprises activating circuitry in the receiver to convert a received high frequency analog signal to an intermediate frequency digital signal.

In some embodiments, step (a) comprises operating the satellite positioning system receiver in the device to collect a set of signals after expiry of a predetermined time interval from the collection of the last set of signals. Alternatively, step (a) can comprise estimating the distance moved by the device from when the most recent set of signals was collected, and operating the satellite positioning system receiver to collect a further set of signals when the estimated distance moved exceeds a threshold value.

Preferably, the position of the device is to be determined according to steps (b), (c) and (d) when an event occurs. In some embodiments, the event can include a fall by the user of the device, the activation of a help button on the device by a user, when an alarm is triggered by the device and/or when the device is otherwise unable to determine its position.

According to a second aspect of the invention, there is provided a computer program product having computer readable code embodied therein, the computer readable code being configured such that, on execution by a suitable processor or computer, the processor or computer is configured to perform the method described above.

According to a third aspect of the invention, there is provided a device that comprises a satellite positioning system receiver; and a processor configured to (a) operate the satellite positioning system receiver to collect a plurality of sets of signals; and when the position of the device is to be determined: the processor is further configured to (b) process a set of signals to determine if the set is likely to contain signals from satellites in the satellite positioning system; and (c) if it is determined at (b) that the set of signals is likely to contain signals from satellites in the satellite positioning system, enabling processing of the set of signals to calculate the position of the device; (d) if it determined at (b) that the set of signals is not likely to contain signals from satellites in the satellite positioning system, repeating (b), (c) and (d) with another set of signals. As the processing of a set of signals to determine if the set is likely to contain signals from satellites by the processor according to the invention requires much less processing and power than full processing of the signals to determine the position of the device, it is possible for the device to collect and assess the usefulness of a set of sampled signals as required while maximizing the battery life of the device.

Preferably, the another set of signals is a set of signals collected prior to the set of signals processed by the processor at (b). This results in the processor 'backtracking' through the collected sets of sampled signals until a set is found that can be used to determine the position of the device.

Preferably, the processor is configured to search the set of signals for codes used by one or more satellites in the satellite positioning system. Each code is typically unique to a particular satellite in the satellite positioning system. In the case where the satellite positioning system receiver is for receiving GPS signals, the code is a PRN code.

Preferably, the processor is configured to determine the codes associated with one or more satellites in the satellite positioning system expected to be in view of the device at the time the set of signals was collected. This means that processing power and time is not wasted looking for codes associated with satellites that are not likely to be in view of the device.

The processor can determine the codes by obtaining the codes from a lookup table stored in a memory, which reduces the processing required by the device to determine the codes.

In a preferred embodiment, the processor is configured to process a set of signals to determine if the set is likely to contain signals from satellites in the satellite positioning system by (i) multiplying the determined codes for the one or more satellites in the satellite positioning system together to form a combined code; (ii) multiplying a subset of the set of signals in a window by the combined code; and (iii) analyzing the output of (ii) to determine if there is any match between the combined code and the set of signals in the window. Combining the codes to form a combined code means that the number of separate multiplication operations can be minimized.

In an alternative embodiment, the processor is configured to process a set of signals to determine if the set is likely to contain signals from satellites in the satellite positioning system by (i) multiplying a subset of the set of signals in a window by one of the determined codes; (ii) repeating (i) for each of the determined codes; (iii) multiplying the output of each iteration of (i) together; and (iv) analyzing the output of (iii) to determine if there is any match between any of the determined codes and the set of signals in the window.

In either embodiment, the window can span a subset of signals whose duration is equal to an integer N multiple of the duration of a code, with N=1, 2, 3, . . . N is advantageously greater than 1 since this improves the sensitivity of the algorithm as a larger portion of the set of sampled signals is searched for the code.

Preferably, the processor is configured to analyses the output of (iii) by filtering the output with a low pass filter; determining the amplitude, power or root mean squared, RMS, of the low pass filtered output; comparing the determined amplitude, power or RMS to a threshold value; and determining that there is a match between one of the determined codes and the set of signals in the window if the determined amplitude, power or RMS exceeds the threshold value.

In some embodiments, the threshold value is a fixed value. However, in preferred embodiments, the processor is configured to adjust the threshold value based on a level of noise in the set of signals.

Preferably, if the processor determines from the analysis of the output of (iii) that there is no match between the determined codes and the set of signals in the window, the processor is configured to shift the window along the set of signals by a first amount and repeat the multiplication for the subset of signals in the shifted window. Preferably, the first amount corresponds to the time taken by a satellite to transmit up to one bit of a code.

If the processor determines from the analysis that there is a match between the determined codes and the set of signals in the window, and two or more matches are required to be found, then the processor is further configured to shift the window along the set of signals by a second amount and repeat the multiplication for the subset of signals in the shifted window. Preferably, the second amount corresponds or substantially corresponds to the time taken by a satellite to transmit a code.

Preferably, the processor can be configured to activate the satellite positioning system receiver in the device for a predetermined time period so that the receiver generates a set of signals. Preferably, the satellite positioning system receiver comprises circuitry for converting a received high frequency analog signal to an intermediate frequency digital signal, and the processor is configured to activate said circuitry.

In some embodiments, the processor is configured to activate the satellite positioning system receiver to collect a set of signals after expiry of a predetermined time interval from the collection of the last set of signals. Alternatively, the processor can be configured to estimate the distance moved by the device from when the most recent set of signals was collected, and to activate the satellite positioning system receiver to collect a further set of signals when the estimated distance moved exceeds a threshold value.

Preferably, the position of the device is to be determined when an event occurs. In some embodiments, the event can include a fall by the user of the device, the activation of a help button on the device by a user, when an alarm is triggered by the device and/or when the device is otherwise unable to determine its position.

In some embodiments, the processor is configured to process the set of signals to calculate the position of the device. In alternative embodiments, the device comprises transmitter or transceiver circuitry, and if it is determined by the processor that the set of signals is likely to contain signals from satellites in the satellite positioning system, the processor is configured to transmit the set of signals to a remote terminal via the transmitter or transceiver circuitry, so that the remote terminal can process the set of signals to determine the position of the device.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

Although the invention will be described below with reference to determining the position of a device using the Global Positioning System (GPS), it will be appreciated that the invention is applicable to any other type of global navigation satellite system (GNSS) or satellite positioning system (SPS), such as the GLONASS or Galileo satellite positioning systems.

Figure 1:
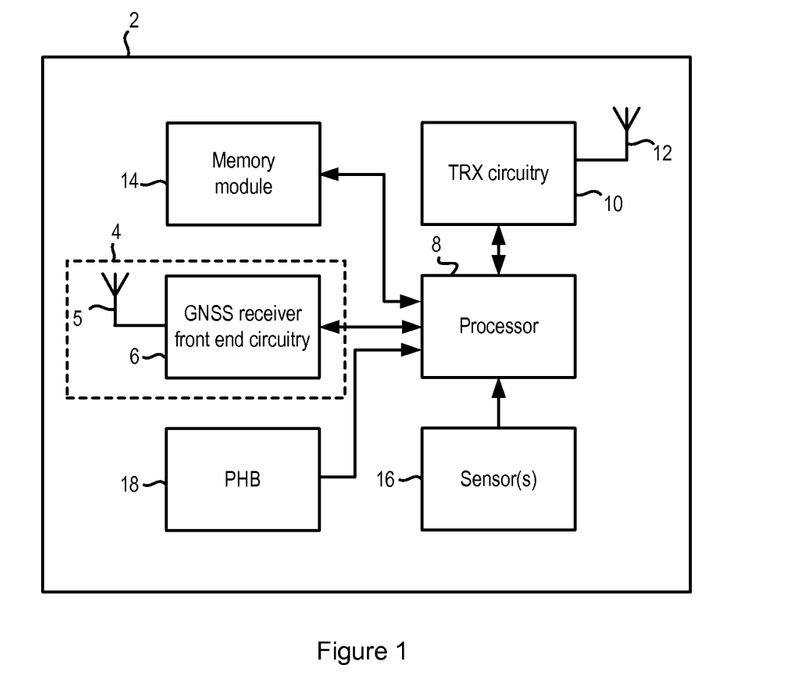
FIG. 1 is a block diagram of a device according to an embodiment of the invention.

An exemplary MPERS device according to an embodiment of the invention is shown in FIG. 1. It will be appreciated however, that the invention can be implemented in any type of portable or mobile electronic device that includes satellite positioning system functionality, such as a mobile telephone, smart phone, fall detector or a navigation device for a vehicle.

An MPERS device 2 is typically in the form of a device that can be worn or carried by a user. The device 2 can be provided in the form of a pendant with a neck cord for placement around the user's neck, but alternatively the device 2 can be configured to be worn at or on a different part of the user's body, such as the wrist, waist, trunk, pelvis or sternum, and may comprise a suitable arrangement for attaching the user device 4 to that part of the body (for example a belt or a strap).

The device 2 comprises a software defined GPS receiver, which, in preferred embodiments, comprises a hardware receiver front end 4 including an antenna 5 that can receive signals transmitted by GPS satellites and GNSS receiver front end circuitry 6 coupled to a processor 8 that executes software to effect the processing of the received signals. The receiver front end circuitry 6 can comprise a highly-integrated GNSS radio front end IC incorporating, for example, one or more bandpass filters, a low-noise filter (lna), a mixer and an analog-to-digital converter to supply a low intermediate frequency (IF) and conditioned interface for software implementations of GPS or GNSS baseband signal processing.

The radio front end circuitry 6 basically converts the high frequency GPS signal received from the GPS satellites to a low intermediate frequency signal while preserving the modulated signal structure. This is to bring the frequency to usable ranges in which the signal can be operated on.

The processor 8 receives the raw IF GNSS signal from the receiver front end circuitry 6 and, at the required time (for example when it is necessary to determine the position of the device 2), performs processing of the signals to determine if signals from GPS satellites are present. In some embodiments, the processor 8 is also capable of determining the position and/or the velocity of the device 2 from the detected GPS satellite signals.

In addition to processing the received satellite signals, the processor 8 controls the general operation of the device 2.

In alternative embodiments, the device 2 can comprise a dedicated hardware GPS receiver module comprising hardware corresponding to receiver front end 4 and a corresponding processor for processing the received signals to determine the position of the device 2.

In the illustrated embodiment, the device 2 further comprises transceiver circuitry 10 that is coupled to the processor 8 and an associated antenna 12 for communicating wirelessly with a mobile communication network. The transceiver circuitry 10 can be used to establish voice calls and/or data sessions between the device 2 and a call center and/or the emergency services.

The device 2 further comprises a memory module 14 connected to the processor 8 that is used to store the raw IF GNSS signals received by the GNSS receiver module 4 as described in more detail below.

In the illustrated embodiment, the device 2 further comprises one or more sensors 16 that can be used to monitor the user of the device 2 or the device 2 itself to determine when an event occurs for which a user might require assistance or help. Suitable sensors 16 include sensors for measuring the movement and/or orientation of the device 2, such as an accelerometer, magnetometer or gyroscope, that output a corresponding signal to the processor 8, as well as sensors for measuring the health status of the user, such as a heart rate monitor, blood pressure monitor, etc. Although not shown in FIG. 1, the one or more sensors 16 can be coupled to a low-power processor associated with processor 8 for processing and analyzing the signals from the sensor(s) 16.

In this illustrated embodiment, the MPERS device 2 further comprises a personal help button (PHB) 18 that the user can use to quickly summon help. It will be appreciated however that PHB 18 does not have to be in the form of a button, but it could be, for example, an option in a graphical user interface of the device 2.

Although not shown in FIG. 1, in some embodiments the MPERS device 2 can be configured to receive signals from other types of satellite positioning systems (such as GLONASS or Galileo) and/or can comprise receivers for receiving other types of signals (such as Wi-Fi signals) from other sources that can be processed to determine the position of the device 2.

As described in the Background section, to help mitigate the 'blind spot problem' (i.e. in which there is no GPS signal available when a GPS receiver module is activated and needs to determine the position of the device), devices can make use of a backtracking algorithm in which at least the most recent position measurement is stored and that measurement used as an estimate of the position of the device if a current measurement of the position is not available. However, in a normal GPS receiver module, or even in a GPS receiver module operating according to a breadcrumbing algorithm, the power consumed by having to calculate the position of the device when each set of signals is collected according to the breadcrumbing algorithm means that it is only possible for the batteries in currently available devices to last a few weeks, whereas, due to the nature of the typical users of such devices, it would be desirable for the batteries in MPERS devices to last for several months. Therefore, the invention provides improvements to the existing backtracking and breadcrumbing techniques that substantially reduce the amount of time and current required to collect the data for each breadcrumb, without increasing the time or current required in other parts of the device 2.

Figure 2:
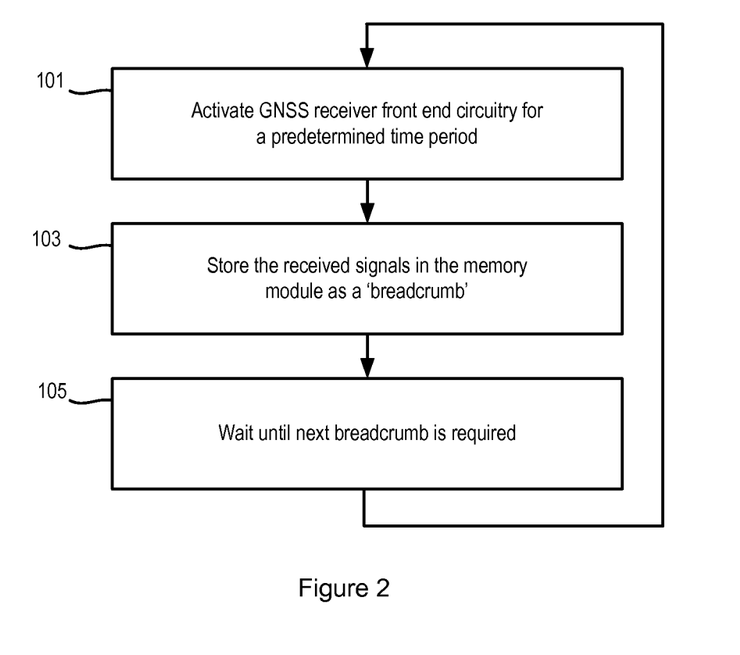
FIG. 2 is a flow chart illustrating a method of collecting breadcrumb data according to the invention.

The flow chart in FIG. 2 illustrates a method of collecting breadcrumb data according to the invention.

In step 101, when a 'breadcrumb' is to be collected, the processor 8 activates the GNSS receiver front-end circuitry 6 for a predetermined time period and samples the received signals. Once the predetermined time period has elapsed, the GNSS receiver front-end circuitry 6 is deactivated. A set of signals received and sampled in the predetermined time period are termed a 'breadcrumb' herein.

Activating the GNSS receiver front end circuitry 6 can comprise supplying power to the circuitry 6 to cause the circuitry 6 to receive and sample raw signal data, with this sampled signal data being supplied to the processor 8 and/or to the memory module 14. Alternatively, the receiver front end circuitry 6 can be maintained in a low power mode where it does not convert or supply the signal data to the processor 8 or memory module 14 when a breadcrumb is not required, and it can be switched into an 'on' mode when a breadcrumb is to be collected.

It will be appreciated that the breadcrumb should be of sufficient length to allow a processor running suitable GNSS processing software or other GNSS or GPS receiver back-end circuitry to process the breadcrumb and to determine the position of the device 2 at the time that the breadcrumb was obtained (provided that GPS satellite signals are present in the breadcrumb). A suitable length for the breadcrumb is in the range from 100 ms to 200 ms, although it will be appreciated that longer or shorter breadcrumbs can be collected. Of course, it will be appreciated that the longer the GNSS receiver front-end circuitry 6 is active (and the longer the breadcrumb), the more power and memory that is consumed, so the breadcrumb length is a trade-off between the need to minimize power consumption and the need to obtain a sufficiently long set of sampled signals in which GPS satellite signals are likely to be found.

The received signals can be sampled at a rate that is in the range from 2 MHz to 8 MHz with each sample being 1 to 4 bits long (although it will be appreciated that other rates and/or bit lengths can be used). Thus, with a breadcrumb length being in the range 100 ms to 200 ms, each breadcrumb will be 25 kB to 800 kB in size. It can be desirable to store several tens or hundreds of breadcrumbs in the memory module 14, so the memory module 14 should be capable of storing at least 2500 kB to 80000 kB of data.

The sampled signals are stored in the memory module 14 (step 103). At this stage, no further processing is performed on the sampled signals (i.e. the sampled signals are not processed to determine if GPS satellite signals are present in the sampled signals or to determine the position of the device 2). This is particularly advantageous for a MPERS device since a position measurement is only required when an event occurs, and therefore the power expended in collecting and storing breadcrumb data is minimized. In exemplary embodiments, for a hardware receiver front end 4 that uses 100 mA when active and that collects around one hundred 100 ms breadcrumbs per day, the average power consumption of the hardware receiver front end 4 will be around 12 µA. This compares favorably to a GNSS receiver operating normally (i.e. that is not using a breadcrumb algorithm) which will use power in the mA range, and to a receiver that is not receiving signals from a satellite and is operating in a search mode (so constantly using around 30 mA).

After step 103, the processor 8 waits until the next breadcrumb is to be collected (step 105), and when the next breadcrumb is to be collected, the method returns to step 101. The time between the collection of successive breadcrumbs will be determined by the breadcrumbing algorithm being executed by the processor 8. In some cases, breadcrumbs can be collected after a fixed time interval, but in other, preferred cases, the breadcrumbing algorithm can be dynamic and the interval between breadcrumbs can be set based on an amount of movement by the device since the collection of the previous breadcrumb (e.g. a new breadcrumb is collected only when a movement sensor 16 in the device 2 indicates that the device 2 has moved by more than a predetermined distance from where the previous breadcrumb was collected).

The method in FIG. 2 repeats until the device 2 is activated or, for example, the device 2 is in range of a home based unit where no extra location information is needed at any moment. This might occur when the user activates the PHB 18, when the device 2 determines that the user might have suffered a fall, or when other alarming sub-systems activate the device 2.

Figure 3:
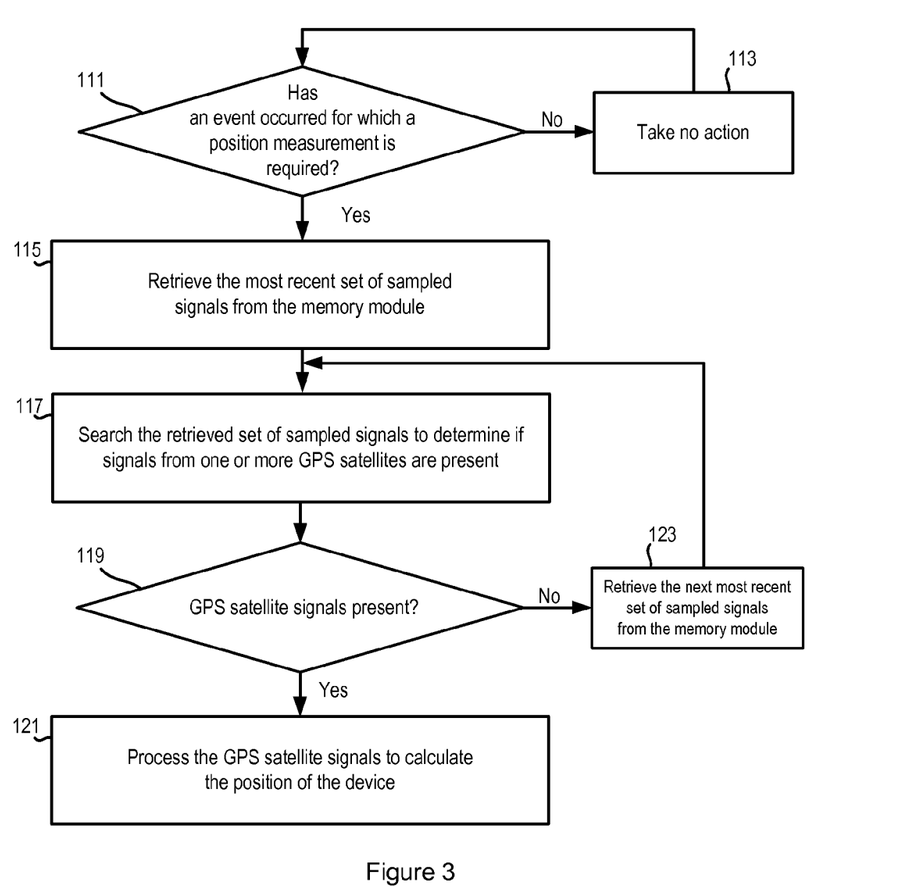
FIG. 3 is a flow chart illustrating a method of processing breadcrumb data according to the invention.

A method of processing breadcrumb data according to the invention is shown in FIG. 3. In step 111, it is determined whether an event has occurred in which a position measurement of the device 2 is required. If not, then no action is taken (step 113).

If a position measurement of the device 2 is required by means of the stored breadcrumbs, then the most recent breadcrumb (i.e. the set of sampled signals stored most recently in the memory module 14) is retrieved from the memory module 14 by the processor 8 (step 115).

At this point, the device 2 could transmit the breadcrumb data to a remote location where it can be processed using complex processing algorithms using all available assistance data (for example the most recent version of the GPS almanac and other data) to determine the position of the device 2. However, it is possible that the breadcrumb data will not contain the required signals from the GPS satellites, so transmitting that breadcrumb to the remote location will effectively waste power in the device 2. Therefore, the processor 8 searches the retrieved set of sampled signals to determine if the sampled signals contain signals from one or more GPS satellites.

Preferably, the processor 8 only searches a portion of the set of sampled signals (e.g. samples covering 1 ms to 10 ms of time, which corresponds to 1 to 10 pseudorandom noise (PRN) codes transmitted by the GPS satellites), since after a short period of searching, if no signals from GPS satellites are found, the likelihood of there being valid data for determining the position of the device 2 in the rest of the sampled signals in the set becomes too low. The portion of the set of sampled signals searched by the processor 8 may be at the start of the breadcrumb or at some position after the start of the breadcrumb. Only searching a portion of the set of sampled signals means that the power consumed in evaluating the usefulness of the breadcrumb is minimized.

If it is determined that signals from one or more (preferably two or more) GPS satellites are present in the retrieved set of sampled signals (step 119), the set of sampled signals are processed in order to calculate the position of the device 2 at the point that that set of sampled signals was collected (step 121).

In preferred embodiments, step 121 is performed remotely from the MPERS device 2. In this case, upon determining that there are signals from one or more GPS satellites in the set of sampled signals in step 119, the MPERS device 2 transmits the set of sampled data to a remote location (such as a base unit for the MPERS device 2 in the home of the user, a call center associated with the MPERS device 2 or the emergency services) via the transceiver circuitry 10 and antenna 12. A processor executing appropriate software or dedicated GNSS receiver back-end circuitry at that location performs the required processing on the breadcrumb data to calculate the position of the device 2. Remote processing of the breadcrumb data is preferred as it allows more powerful techniques and assistance data to be used to process the set of sampled signals to calculate the position of the device 2.

Alternatively, step 121 can be performed by the MPERS device 2 itself. In this case, the processor 8 can process the set of sampled signals to calculate the position of the MPERS device 2 (or alternatively the device 2 can be provided with the appropriate back-end circuitry). The calculated position can then be transmitted from the MPERS device 2 to the required destination via the mobile communication network transceiver circuitry 10 and antenna 12.

Returning to step 119, if no GPS satellite signals are found in the portion of the retrieved set of sampled signals searched by the processor 8, the method passes to step 123 in which the set of sampled signals is discarded and the next most recent set of sampled signals is retrieved from the memory module 14. The method then returns to step 117 and the newly retrieved set of sampled signals are searched to determine if signals from one or more satellites are present.

Thus, step 123 implements a 'backtracking' procedure that is used to find the most recent set of sampled signals that contains valid GPS satellite signals.

The search performed by the processor 8 in step 117 allows breadcrumb data to be evaluated quickly and efficiently to determine whether it is worth transmitting or further processing that data to calculate the position of the device 2. The alternatives are for the processor 8 or GPS module 4 to attempt a full calculation of the position of the device 2 from the most recent set of sampled signals (which might require assistance data, such as GPS almanac data, to be sent from the call center in order for the calculation to be completed and which will consume significantly more power), or for the MPERS device 2 to transmit the data for multiple breadcrumbs to the remote location, which requires the MPERS device 2 to have a good data link with the mobile communication network and thus also consumes a lot of power.

In a further embodiment of the invention, prior to executing step 115 and retrieving the most recent set of sampled signals from the memory module 14 after an event occurs, the device 2 can attempt to obtain a current position measurement using the GNSS receiver front end circuitry 6 and software executing on the processor 8. If it is not possible to determine the position of the device 2 using the GNSS receiver (for example if the device 2 is indoors or in an 'urban canyon' and no satellites are in view of the device 2) then the device 2 can attempt to determine its position using an alternative measurement technique, such as using a Wi-Fi transceiver to identify nearby Wi-Fi networks or by using mobile cell triangulation. Only if the device 2 is unable to determine a position using GPS or these other techniques, will the device 2 perform the method in FIG. 3 and process the breadcrumb data according to the invention. This embodiment has the advantage that the device 2 can attempt to obtain a current position measurement before making use of the breadcrumb data.

Figure 4:
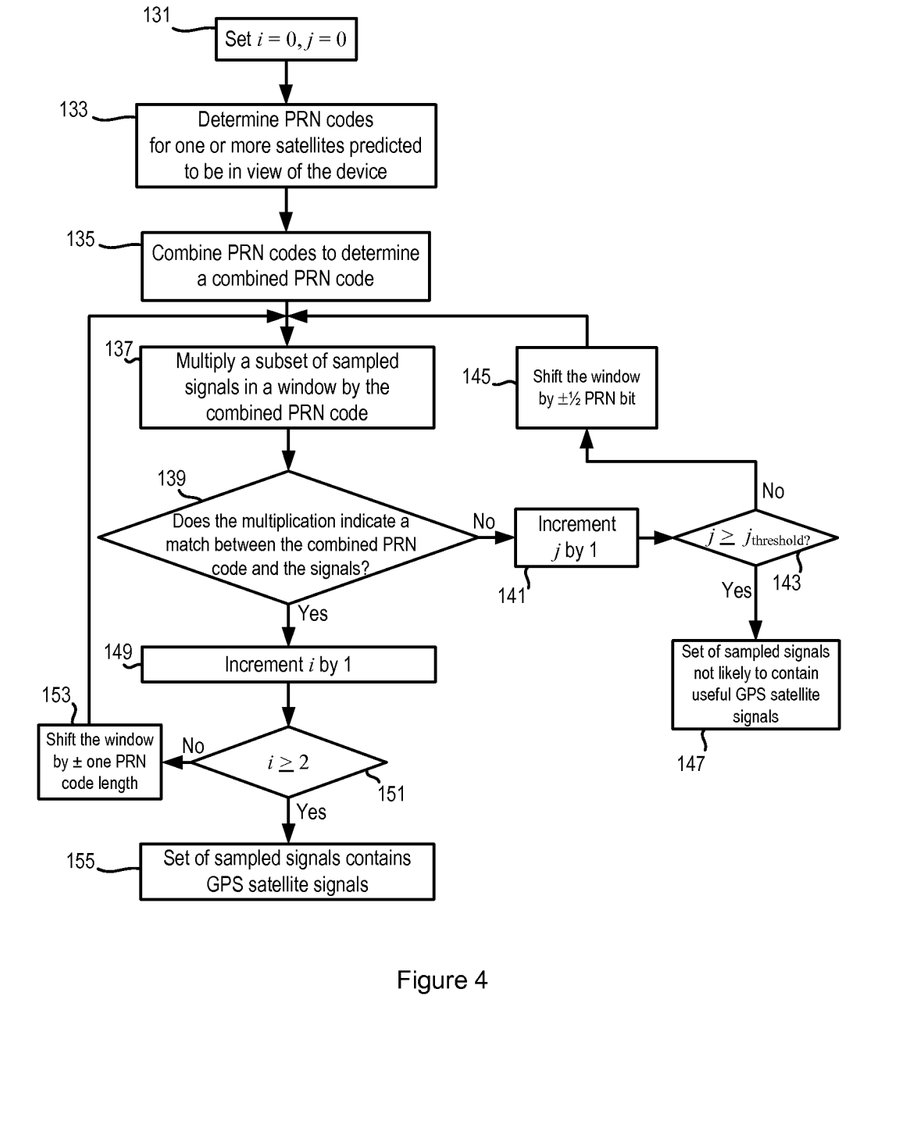
FIG. 4 is a flow chart illustrating an exemplary method of implementing step 117 from FIG. 3 according to an embodiment of the invention.
Figure 5:
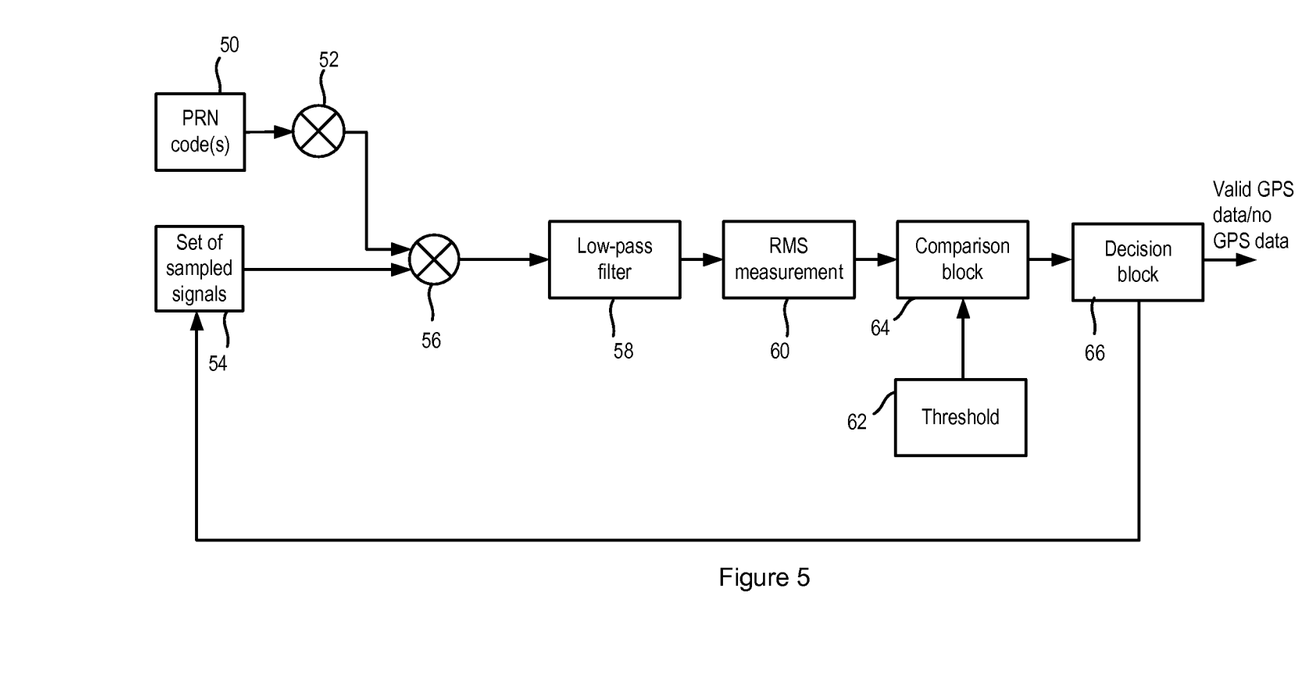
FIG. 5 is a block diagram illustrating the processing performed according to the method in FIG. 4.

An exemplary method for executing step 117 is described below with reference to FIGS. 4 and 5. FIG. 4 is a flow chart of the method used to search the sampled signals for signals from the GPS satellites and FIG. 5 is a block diagram illustrating the processing steps. In the first step of FIG. 4, step 131, a parameter i (that is used to represent the number of matches/alignments found in the sampled signals with signals from GPS satellites) is initialized to 0 and a parameter j (representing the number of multiply and shift operations performed on the breadcrumb data) is also initialized to 0.

GPS satellites broadcast their signals using a spreading code (the PRN code), which means that the signal is spread into a noise signal and is not detectable by a normal power measurement. Therefore, an alternative approach is required in order to detect whether GPS satellite signals are present in a set of sampled signals in a simple and low power manner. In particular, a serial search of the sampled signals is performed for the GPS satellites that are predicted to be in view of the device 2.

As is known, the signals from each GPS satellite are spread using a pseudorandom noise (PRN) code unique to each satellite which is repeated every 1 ms. The PRN codes for each of the GPS satellites are orthogonal to each other. Therefore, in the second step of FIG. 4 (step 133), the PRN codes for one or more GPS satellites that are predicted to be in view of the device 2 are determined.

Preferably, the device 2 has a table listing the locations, times and orbits of the GPS satellites (and corresponding PRN codes) stored in the memory module 14 from which the processor 8 can determine the satellites most likely to be in view of the device 2 at any specific time using a rough estimate of the position of the device 2. The table can correspond to, or be derived from, GPS almanac data. The rough estimate of the position of the device 2 can correspond to the most recently calculated position measurement (whether obtained using GPS, Wi-Fi, cell triangulation or otherwise), or to the home location of the user (if known). Each satellite is visible within a large area, the estimate of the position of the device 2 does not need to be particularly accurate (e.g. to the nearest 100 km is acceptable).

Then, once the PRN codes are determined, they are preferably multiplied together to generate a single (combined) PRN code (step 135). This can also be seen in FIG. 5 where the PRN codes 50 for the GPS satellites predicted to be in view are combined by multiplier 52. Typically up to six satellites might be expected to be in view of the device 2, and therefore, in preferred embodiments, between three and six PRN codes are multiplied together in step 135 to generate the single (combined) PRN code. Determining the number of codes to multiply together is a trade-off between processing time required to detect the satellite signals in the following steps and the sensitivity to those signals. The more satellites being considered (i.e. the more PRN codes multiplied together) the longer the integration time required for the process to be sensitive enough to detect the satellite signals. It has been found that multiplying three PRN codes together provides a good balance of processing time and sensitivity. Where the PRN codes for less than six satellites are to be multiplied together, the PRN codes for a subset of the six satellites can be selected at random, or they can be selected based on the satellites expected to be highest in the sky at the time the breadcrumb was collected (since those satellites are less likely to be obscured by buildings or other obstacles).

It will be appreciated that steps 133 and 135 can be performed offline (i.e. they do not necessarily need to be performed when an event has occurred where the device 2 needs to determine its position), and the combined PRN stored in the memory module 14 for subsequent use.

After the combined PRN code has been determined, the set of sampled signals forming the breadcrumb are searched using the combined PRN code to determine if signals from one or more of the satellites whose PRN codes form the combined PRN code are present. In particular embodiments, this search is performed by multiplying each bit of the combined PRN code by each sample in the set of sampled signals (step 137). This multiplication is similar to that performed in dispreading the signal (although not quite since the 'despreading' is done using the combined PRN code).

In particular, each bit of the combined PRN code is multiplied with each sample in a subset of the set of sampled signals in a time window of duration T, where T is equal to an integer N multiple of the duration of the combined PRN code. T is typically 1, i.e. the duration of the time window is the same as the duration of the combined PRN code, although higher values of T improve the sensitivity of the algorithm since a larger portion of the breadcrumb is searched for the combined PRN code in one multiplication operation. Initially, the window can be 'positioned' so that the first sample in the window is the first sample in the breadcrumb. However, where information from a previous search of the set of sampled signals is available, it is possible to predict the position where the PRN codes are likely to align, so it will be appreciated that the initial position of the window on the set of sampled signals during subsequent multiplications can beset based on this information. The multiplication is also illustrated in FIG. 5 as the set of sampled signals 54 are provided to multiplier 56 along with the combined PRN code output by multiplier 52.

It will be appreciated that in order for the set of sampled signals 54 to be multiplied with the combined PRN code, the sampling rate of the set of sampled signals must match the rate of the combined PRN code. This is achieved at step 101 by the receiver front end circuitry 6 downconverting the original carrier frequency signal to the low IF frequency and then sampling the IF frequency signal at a rate that matches the transmission rate of a PRN code.

After the multiplication in step 137, the result of the multiplication is assessed to determine if there is a match between the combined PRN code and the sampled signals in the window (step 139). The result of the multiplication represents a low frequency IF sinusoidal signal of the despread signal that includes the carrier signals from each of the satellites whose PRN codes have been used to form the combined PRN code. If a significant part of the combined PRN code matches or aligns in time with the set of sampled signals in the window, then ideally one (near-zero) frequency with a larger amplitude (representing the signal from the satellite(s)) remains. The amplitude of the signal will increase if satellite signals are present in the sampled signals.

Because of Doppler effects the frequency of this sinusoidal signal can shifted by 10 kHz in devices 2 that are moving and by 5 kHz for devices 2 that are stationary. The maximum amplitude will occur when the multiplication window on the sampled signals is perfectly aligned with a PRN code in the signal. However, in practice only parts of the sampled signal will be aligned with different parts of the combined PRN code. Thus, a power or amplitude measurement is taken (after low pass filtering at 5 or 10 kHz) will show a significant increase if large and/or multiple parts align.

Therefore, to determine the extent of the match, the result of the multiplication step is low-pass filtered (as shown by low-pass filter block 58 in FIG. 5) to extract this low frequency signal, and one or more of the amplitude, power or root mean square (RMS) of the low frequency signal is calculated (block 60 in FIG. 5). The result of the amplitude, power or RMS measurement is compared to a threshold value 62 in comparison block 64. If the amplitude, power or RMS measurement exceeds the threshold value 62, then a match or alignment between one or more of the PRN codes making up the combined PRN code and the sampled signals has been found.

In some embodiments, the threshold value 62 is a fixed value. The threshold value to be used by a specific device 2 will be determined, at least in part, by the characteristics of the hardware in the device 2 (for example the gain of the front end circuitry 6). The threshold value can also depend on the noise level present in the sampled signals. Thus, in alternative embodiments, the threshold value 62 can be adjusted during use of the device 2 based on the level of noise in the received signals. This is because for signals received from GPS satellites, the 'signal' level (i.e. the strength of the useful part of the received signal) is extremely small compared to the noise level (i.e. the strength of everything else in the received signal), which means that increasing noise affects the sensitivity of the receiver 4. To provide as sensitive a receiver as possible in order to distinguish between normal noise and noise with satellite signals included, the threshold value 62 should be adapted according to the noise levels present in the sampled signals. The average amplitude of the noise level can be determined, and that used as a base/zero point for the threshold value.

The output of the comparison block 64 is passed to a decision block 66. If the amplitude, power or RMS measurement does not exceed the threshold value 62, then no match is found for the combined PRN code and the current set of sampled signals in the window.

In step 141, the parameter j (representing the number of multiply and shift operations performed on the breadcrumb data) is incremented by 1, and the value of j is compared to a threshold value, $j_{threshold}$ (step 143). If the value of j is less than the threshold value, then the method proceeds to step 145 in which the decision block 66 causes the window on the sampled signals to be shifted along the breadcrumb data 54 by a predetermined amount. After the window is shifted, the method returns to step 137 where the set of sampled signals in the shifted window is multiplied with the combined PRN code.

If the value of j is equal to or greater than the threshold value, $j_{threshold}$, then a predetermined number of multiply and shift operations (i.e. cycles of steps 137, 139 and 145) have been completed without finding a match between the combined PRN code and the sampled signals forming the breadcrumb, and it can be determined that the current breadcrumb is not likely to contain useful GPS satellite signals (step 147). In that case, returning to the flow chart in FIG. 3, the output of the determination in step 119 is negative and the next most recent breadcrumb is retrieved from the memory module 14 (step 123). As described above in relation to step 117, preferably only 1 to 10 ms of the breadcrumb data is searched, in which case the threshold value $j_{threshold}$ is determined accordingly. Limiting the searching of the breadcrumb data in this way is desirable since after a short period of searching (e.g. 1 to 10 ms of the breadcrumb data), if no signals from GPS satellites are found, the likelihood of there being valid data for determining the position of the device 2 in the rest of the sampled signals in the set becomes too low.

Returning to step 145, in preferred embodiments, the window is shifted along the breadcrumb data by half of one bit of a PRN code. As a PRN code is a 1023 bit sequence that is transmitted in full every 1 ms, shifting the window by one half of a PRN code bit means shifting the window along the sampled signals in the breadcrumb by around 488 ns. It will be appreciated however that the window can be shifted by alternative amounts, such as one quarter of a PRN code bit, or a whole PRN code bit. Alternatively, the window can be shifted along by an integer number of sampled signals, with the integer being determined according to the sampling rate used to generate the sampled signals and the amount of time that the window is to be shifted.

If the amplitude, power or RMS measurement exceeds the threshold value 62, then it is likely that signals from one or more of the GPS satellites whose PRN codes form the combined PRN code has been found in the breadcrumb data. Therefore, in step 149 the parameter i is incremented by 1 (the parameter i indicates the number of matches found between the sampled signals and the combined PRN code), and it is determined in step 151 if a sufficient number of matches have been found in the breadcrumb for the processor 8 to determine that the breadcrumb contains valid or useful GPS satellite signals.

In the illustrated embodiment, the required number of matches is two, so if i is less than two, the method proceeds to step 153 in which the window on the sampled signals is shifted along the breadcrumb data by approximately one whole PRN code length (e.g. 1 ms). The method then returns to step 137 where the set of sampled signals in the shifted window is multiplied with the combined PRN code to attempt to find further matches between the combined PRN code and the sampled signals.

If, or when, two or more matches are found with the breadcrumb data (i.e. i is equal to or greater than two in step 151), then it can be determined that the current breadcrumb is likely to contain valid or useful GPS satellite signals (step 155), and step 121 in FIG. 3 can be performed on the breadcrumb.

It will be appreciated, however, that in alternative embodiments, it may be sufficient to identify a single match between the combined PRN code and the sampled signals, in which case steps 149, 151 and 153 can be omitted. It will also be appreciated that it may be desirable to find more than two matches with the sampled signal before concluding that the breadcrumb contains valid or useful GPS satellite signals.

As described above, in step 135 multiple PRN codes are combined to produce a combined PRN code. This is done to reduce the number of sampled signals in the breadcrumb that need to be searched, as it increases the chance that part of one of the PRN codes will match part of the sampled signal in the multiplication window.

In an alternative embodiment, step 135 can be omitted. In this embodiment, each of the PRN codes identified in step 133 are individually multiplied with the sampled signals in the multiplication window (similar to step 137), and the results of each multiplication are themselves multiplied together. The result is then processed as shown in FIG. 5 (i.e. low-pass filtered before an amplitude, power or RMS measurement is taken). Although this embodiment removes the need for step 135, separately multiplying the sampled signals in the window by each of the PRN codes increases the overall amount of processing required, and thus results in a slightly higher power consumption than the illustrated embodiment.

In either the illustrated embodiment or the alternative embodiment described in the preceding paragraph, preferably only simple functions are used during each of the steps of the method in order to minimize the processing required and thus the power consumed. For example, in the multiplication step, each bit of the combined PRN code is multiplied with each 1-4 bit sample in the sampled signal. In addition or alternatively, the low pass filtering block 58 can be a basic 2e order low pass filter, and/or the RMS measurement function (block 60) can be limited.

Because the chances of a disturbance signal being present in the received signal in sync with the PRN code from a GPS satellite is very low, the simple algorithm described above has been found to be reliable enough in detecting GPS satellite signals. The algorithm provides a very fast, low power and low complexity way to select valid GPS data from a large set of breadcrumbs, and where the breadcrumb data is to be transmitted to a remote location for full position processing, the algorithm reduces the amount of data to be transmitted by the device 2 to a small number of breadcrumbs, further improving the power consumption of the device 2.

There is therefore provided an improved breadcrumbing technique that maximizes the battery life and reduces the frequency with which the user has to recharge or replace the batteries in their device, while maximizing the chance that the device can provide an accurate or reasonably recent location or position measurement when required.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining the position of a device using a satellite positioning system, the method comprising:
    (a) operating a satellite positioning system receiver in the device to collect a plurality of sets of signals; and when the position of the device is to be determined:
    (b) processing a set of signals to determine if the set is likely to contain signals from satellites in the satellite positioning system by searching only a sub-portion of the set of signals to determine if the set contains the signals from the satellites; and
    (c) if it is determined in step (b) that the set of signals is likely to contain signals from satellites in the satellite positioning system, processing the set of signals to calculate the position of the device;
    (d) if it determined in step (b) that the set of signals is not likely to contain signals from satellites in the satellite positioning system, repeating steps (b), (c) and (d) with another set of signals.

2. The method as claimed in claim 1, wherein said another set of signals is a set of signals collected prior to the set of signals processed in step (b).

3. The method as claimed in claim 1, wherein step (b) comprises searching the set of signals for codes used by one or more satellites in the satellite positioning system.

4. The method as claimed in claim 3, wherein step (b) comprises:

determining the codes associated with one or more satellites in the satellite positioning system expected to be in view of the device at the time the set of signals was collected.

5. The method as claimed in claim 4, wherein step (b) further comprises:
(i) multiplying the determined codes for the one or more satellites in the satellite positioning system together to form a combined code;
(ii) multiplying a subset of the set of signals in a window by the combined code; and
(iii) analyzing the output of step (ii) to determine if there is any match between the combined code and the set of signals in the window.

6. The method as claimed in claim 4, wherein step (b) comprises:
(i) multiplying a subset of the set of signals in a window by one of the determined codes;
(ii) repeating step (i) for each of the determined codes;
(iii) multiplying the output of each iteration of step (i) together; and
(iv) analyzing the output of step (iii) to determine if there is any match between any of the determined codes and the set of signals in the window.

7. The method as claimed in claim 5, wherein the window spans a subset of signals whose duration is equal to an integer N multiple of the duration of a code, with N=1, 2, 3, . . . .

8. The method as claimed in claim 5, wherein the step of analyzing comprises:
filtering the output with a low pass filter;
determining the amplitude, power or root mean squared, RMS, of the low pass filtered output;
comparing the determined amplitude, power or RMS to a threshold value; and
determining that there is a match between one of the determined codes and the set of signals in the window if the determined amplitude, power or RMS exceeds the threshold value.

9. The method as claimed in claim 8, wherein the threshold value is adjusted based on a level of noise in the set of signals.

10. The method as claimed in claim 5, wherein, if it is determined in the step of analyzing that there is no match between the determined codes and the set of signals in the window, step (b) further comprises:
shifting the window along the set of signals by a first amount and repeating the steps of multiplying for the subset of signals in the shifted window.

11. The method as claimed in claim 10, wherein the first amount corresponds to the time taken by a satellite to transmit up to one bit of a code.

12. The method as claimed in claim 5, wherein, if it is determined in the step of analyzing that there is a match between the determined codes and the set of signals in the window, and step (b) requires two or more matches to be found, then step (b) further comprises:
shifting the window along the set of signals by a second amount and repeating the steps of multiplying for the subset of signals in the shifted window.

13. The method as claimed in claim 12, wherein the second amount corresponds or substantially corresponds to the time taken by a satellite to transmit a code.

14. A non-transitory computer program product having computer readable code embodied therein, the computer readable code being configured such that, on execution by a suitable processor or computer, the processor or computer is configured to:
(a) operate a satellite positioning system receiver in a device to collect a plurality of sets of signals;
(b) process a set of signals to determine if the set is likely to contain signals from satellites in a satellite positioning system by searching only a sub-portion of the set of signals to determine if the set contains the signals from the satellites; and
(c) if it is determined in step (b) that the set of signals is likely to contain signals from satellites in the satellite positioning system, processing the set of signals to calculate a position of the device; and
(d) if it determined in step (b) that the set of signals is not likely to contain signals from satellites in the satellite positioning system, repeating steps (b), (c) and (d) with another set of signals.

15. A device, comprising:
a satellite positioning system receiver;
a processor configured to:
(a) operate the satellite positioning system receiver to collect a plurality of sets of signals; and
when the position of the device is to be determined:
(b) process a set of signals to determine if the set is likely to contain signals from satellites in the satellite positioning system by searching only a sub-portion of the set of signals to determine if the set contains the signals from the satellites; and
(c) if it is determined at (b) that the set of signals is likely to contain signals from satellites in the satellite positioning system, enabling processing of the set of signals to calculate the position of the device;
(d) if it determined at (b) that the set of signals is not likely to contain signals from satellites in the satellite positioning system, repeating (b), (c) and (d) with another set of signals.

16. The method as claimed in claim 1, wherein the set of signals in on an order of 100-200 milliseconds in length, and the sub-portion is on an order of 1-2 milliseconds in length.

17. The method as claimed in claim 1, wherein the sub-portion is at a start of the set of signals.

18. The method as claimed in claim 1, wherein the sub-portion is at a location of the set of signals other than at a start of the set of signals.

19. The method as claimed in claim 1, wherein the set of signals is determined to likely to contain the signals from the satellites in response to the sub-portion containing the signals.

20. A method of determining the position of a device using a satellite positioning system, the method comprising:
(a) operating a satellite positioning system receiver in the device to collect a plurality of sets of signals; and when the position of the device is to be determined:
(b) processing a set of signals to determine if the set is likely to contain signals from satellites in the satellite positioning system, wherein the processing comprises:
searching the set of signals for codes used by one or more satellites in the satellite positioning system;
determining the codes associated with one or more satellites in the satellite positioning system expected to be in view of the device at the time the set of signals was collected;
multiplying the determined codes for the one or more satellites in the satellite positioning system together to form a combined code;

multiplying a subset of the set of signals in a window by the combined code; and analyzing the output of step (ii) to determine if there is any match between the combined code and the set of signals in the window; and (c) if it is determined in step (b) that the set of signals is likely to contain signals from satellites in the satellite positioning system, processing the set of signals to calculate the position of the device;

(d) if it determined in step (b) that the set of signals is not likely to contain signals from satellites in the satellite positioning system, repeating steps (b), (c) and (d) with another set of signals.

21. A method of determining the position of a device using a satellite positioning system, the method comprising:

(a) operating a satellite positioning system receiver in the device to collect a plurality of sets of signals; and when the position of the device is to be determined:

(b) processing a set of signals to determine if the set is likely to contain signals from satellites in the satellite positioning system, wherein the processing comprises:

searching the set of signals for codes used by one or more satellites in the satellite positioning system;

determining the codes associated with one or more satellites in the satellite positioning system expected to be in view of the device at the time the set of signals was collected;

(i) multiplying a subset of the set of signals in a window by one of the determined codes;

(ii) repeating step (i) for each of the determined codes;

(iii) multiplying the output of each iteration of step (i) together; and (iv) analyzing the output of step (iii) to determine if there is any match between any of the determined codes and the set of signals in the window; and (c) if it is determined in step (b) that the set of signals is likely to contain signals from satellites in the satellite positioning system, processing the set of signals to calculate the position of the device;

(d) if it determined in step (b) that the set of signals is not likely to contain signals from satellites in the satellite positioning system, repeating steps (b), (c) and (d) with another set of signals.

* * * * *